United States Patent Office 3,530,320
Patented Sept. 22, 1970

3,530,320
STATOR COOLING MEANS FOR DYNAMO-ELECTRIC MACHINES
David Fulton Davidson, Hale Barns, England, assignor to Associated Electrical Industries Limited, London, England, a British company
Filed Nov. 20, 1968, Ser. No. 777,388
Claims priority, application Great Britain, Nov. 22, 1967, 53,215/67
Int. Cl. H02k 9/10
U.S. Cl. 310—52                                6 Claims

ABSTRACT OF THE DISCLOSURE

The stator of a dynamo-electric machine has cooling ducts allowing the circulation of a fluid coolant to cool the stator. A gas-impervious cylinder is disposed in the annular gap between the rotor and the stator, fast with the stator, and spaced from the bore of the stator to permit circulation of the fluid coolant over said bore.

---

This inventiton relates to dynamo-electric machines, and particularly to very large electrical generators such as are used in central power stations.

It has been proposed to surround the rotor of such a machine by a gas impervious cylinder and to provide cooling ducts within the stator for the circulation of a fluid coolant to effect the cooling of the stator.

An object of the present invention is to provide a dynamo-electric machine of this form having a particularly advantageous construction as will be apparent from the following description.

According to the present invention a dynamo-electric machine comprises a rotor, a stator having cooling ducts allowing the circulation of a fluid coolant to cool the stator, a gas-impervious cylinder disposed in the annular gap between the rotor and the stator, fast with the stator and containing the rotor, and spacing members spacing the outer surface of the cylinder from the bore of the stator, to permit circulation of fluid coolant over said bore.

Such an arrangement ensures a more efficient cooling by allowing the coolant fluid to circulate and pass over the stator bore.

Conveniently the rotor carries field windings which are arranged to be energised by a direct current in use to produce a magnetic field which is stationary with respect to the rotor but rotates with the rotor, and the stator carries armature windings in which voltages are induced by the rotating magnetic field, the stator comprising a core formed by a stack of laminations the planes of which extend normally to the axis of the rotor, these laminations being divided axially of the machine into sets so as to leave radially extending cooling ducts between adjacent sets.

The inner surface of said cylinder may define part of an enclosure in which the rotor can run in a gaseous medium of low pressure or low density. The gaseous medium may conveniently be hydrogen and may act as a coolant for the rotor. Alternatively, the rotor may be liquid cooled, and said enclosure may contain air at a reduced pressure.

One dynamo-electric machine in accordance with the invention will now be described, by way of example, with reference to the accompanying drawing in which.

Figure 4:
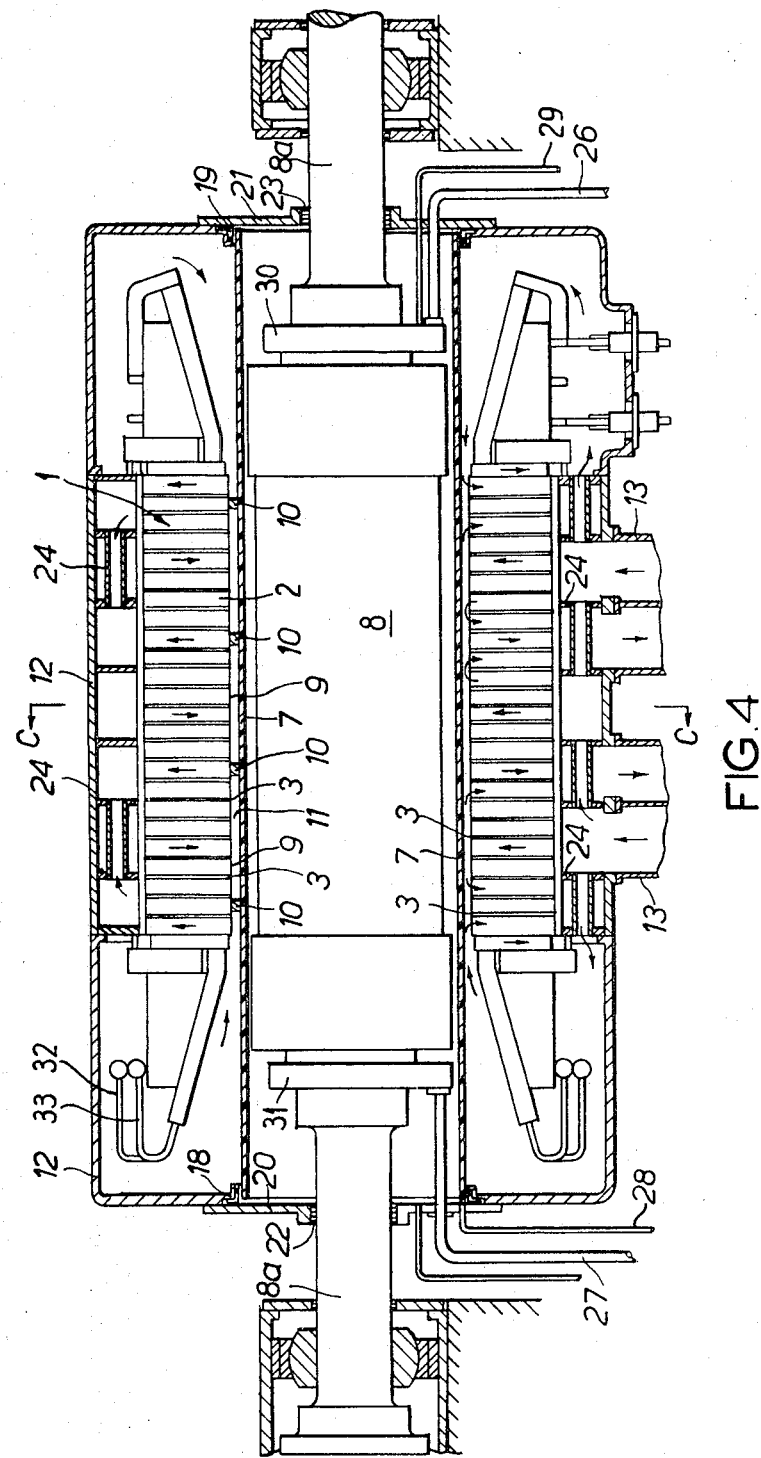

FIG. 4 is an axial cross-section of the generator. The top half of FIG. 4 is a part section AA of FIG. 1. The bottom half of FIG. 4 is a part section BB of FIG. 1.

Figure 1:
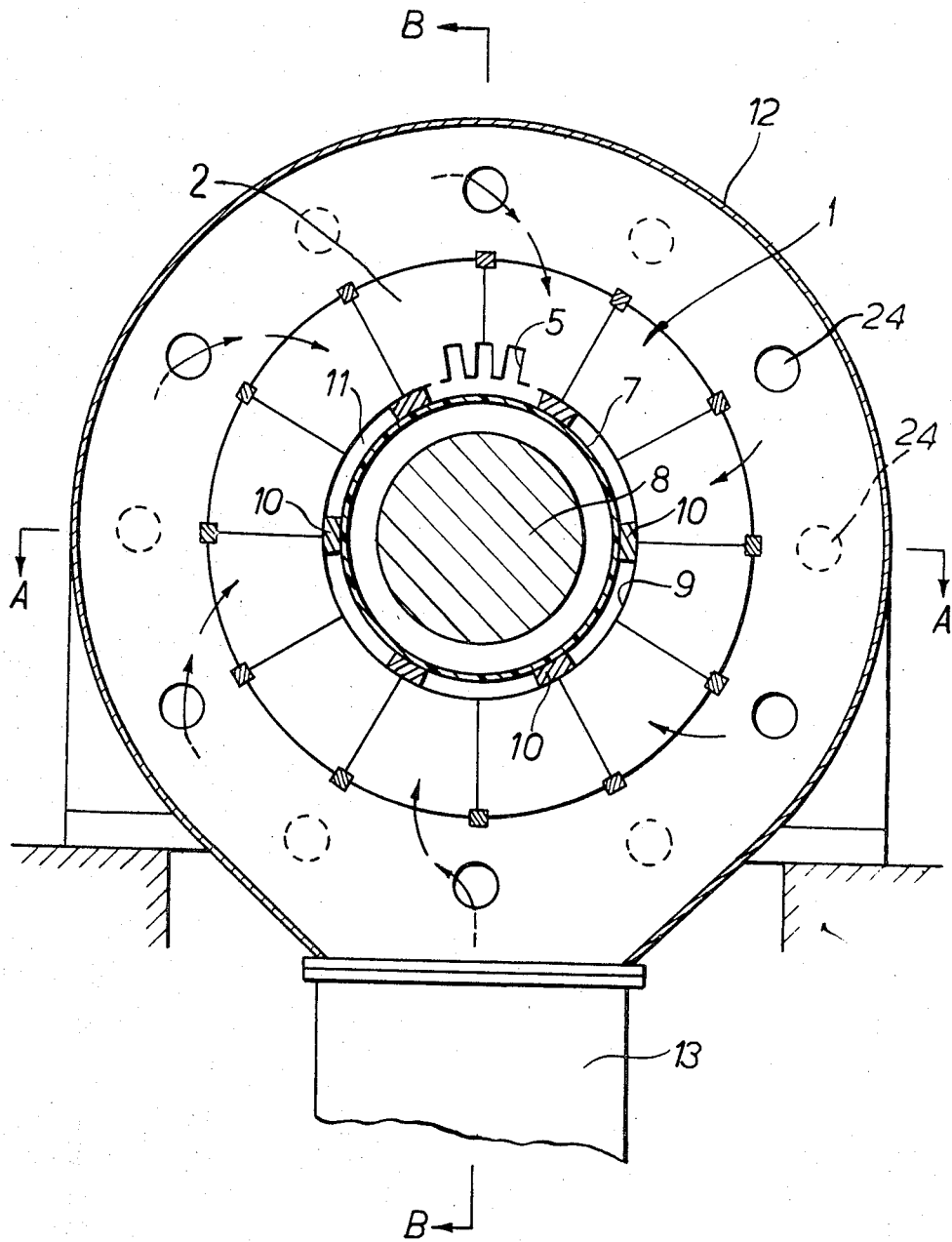
FIG. 1 is a transverse cross-section of an electrical generator embodying the invention.

Referring to FIGS. 1 and 4 the stator core 1 is formed of sets of laminations with ring-like cooling ducts 3 between the sets.

The laminations have slots 5 at their inner surface. For the sake of clarity, only three of these slots 5 are shown in FIG. 1. A gas-impervious and electrically insulating cylinder 7 is disposed in the annular gap between the rotor 8 and the bore 9 of the stator. This cylinder is spaced from the stator bore 9 by means of spacing members 10, and the resulting annular space 11 between the stator and the cylinder allows air to circulate and pass over the bore of the stator. The stator is surrounded by a casing 12 and cooling air is passed to and from the stator via a trunking arrangement 13.

Figure 2:
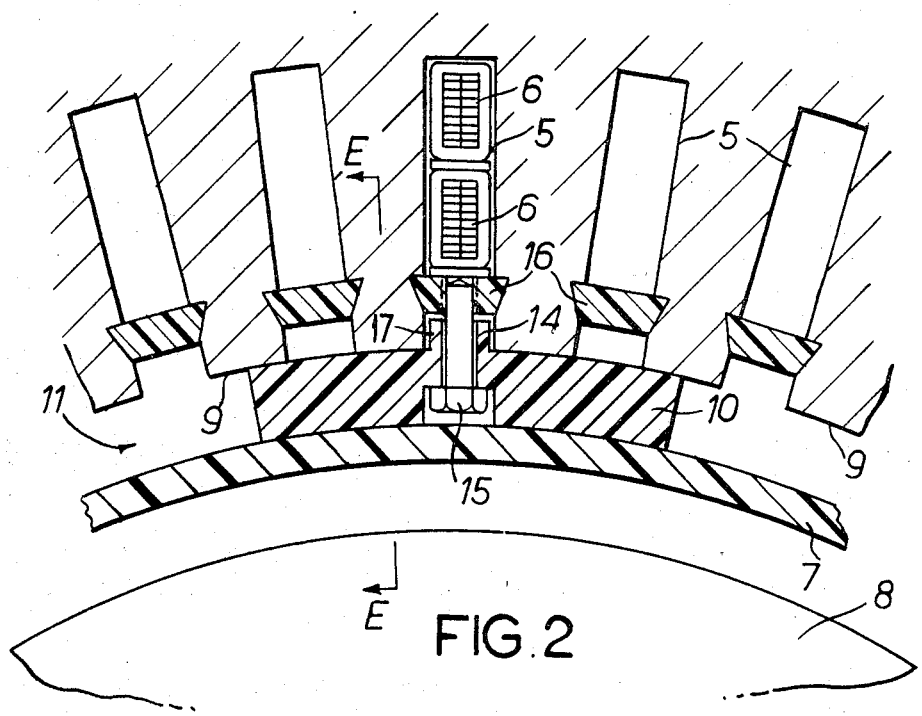
FIG. 2 is a transverse cross-section in greated detatil of part of the electrical generator.
Figure 3:
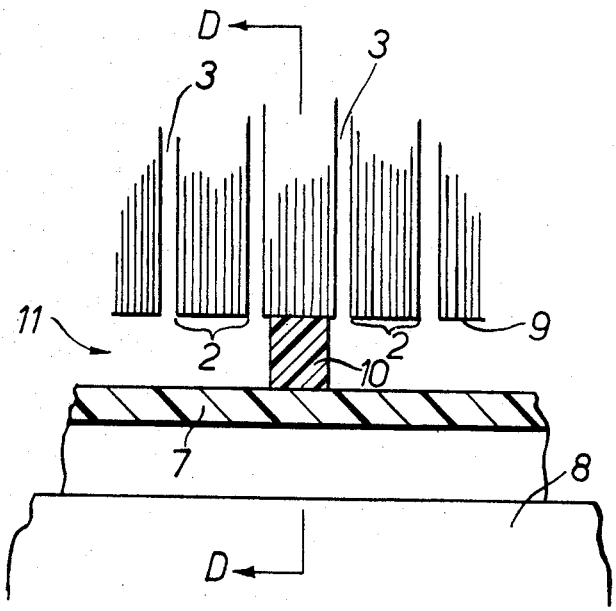
FIG. 3 is an axial cross-section along the line E—E of FIG. 2.

Referring now to FIG. 2 the slots 5 house conductors 6 which are insulated from each other and from the stator core 1 and form the stator winding of the generator. The conductors 6 are hollow to permit the passage of cooling liquid, and they are retained in their slots by epoxy glass wedges 16. Only one set of conductors 6 is shown in FIG. 2.

Each spacing member 10 is of epoxy glass or polyester glass and has a bore 14 through which a nylon screw 15 passes and screws into one of the epoxy glass wedges 16. A protruding portion 17 of the member 10 locates in slot 5 and the surfaces of member 10 are curved corresponding to the radii of curvature on which the stator bore 9 and the outer surface of the cylinder 7 lie.

In operation, a gaseous cooling medium, air for example, is circulated through the passages 4 up and down the ducts 3 and over the bore 9 to cool the stator core 1. The arrows in the FIG. 4 indicate the flow of cooling air through the stator cooling ducts and the trunking arrangement. Air conduits such as 24 are spaced circumferentially round the stator core 1 and serve selected ones of the ducts 3 in the laminations, either supplying air to or taking it from the ducts, in a manner whereby thorough circulation is achieved. The trunking 13 is connected to an air cooler and fans (not shown) in the foundations.

Referring again to FIG. 4, the rotor 8 is liquid cooled as described in our co-pending application Ser. No. 777,247 and runs in a gaseous medium of low pressure such as air at 0.25 atmosphere to reduce windage. Cooling liquid is supplied to the rotor via a supply pipe 29, and is collected by overflow collectors 30, 31 and taken by drains 26 and 27 to a storage tank (not shown). The cylinder 7 is sealed at each end by annular sealing glands 18 and 19 of the stuffing-box type to the outer casing 12 of the generator. End walls 20 and 21, together with the cylinder 7 define a substantially gas-tight enclosure around the rotor 8, walls 20 and 21 having sealing means 22 and 23 between themselves and the rotor shaft 8a.

The hollow stator conductors 6 are connected to inlet and outlet water manifolds 32 and 33 and a pipe 28 is connected to a liquid leakage indicator for detecting undue leakage of liquid from the rotor cooling system.

In an alternative arrangement in accordance with the invention the rotor may be surrounded by a light gas such as hydrogen, and this may be used also to cool the rotor internally instead of the liquid.

It will be appreciated that many other modifications to the arrangement described above are possible within the scope of the invention.

I claim:
1. A dynamo-electric machine comprising a fluid-cooled rotor, a stator having cooling ducts for permitting the circulation of fluid coolant therethrough to cool the stator, a gas-impervious cylinder disposed in the annular gap between the rotor and stator and extending substantially the whole length thereof so as to separate the stator from the rotor, and spacing members, secured within the bore of the stator and bearing against the outer surface of the cylinder, for supporting the cylinder in fixed, spaced relationship with the bore, to permit stator cooling fluid to be circulated freely over said bore.

2. A dynamo-electric machine as claimed in claim 1 wherein each spacing member extends for only a small distance circumferentially and axially of the cylinder, individual spacing members being spaced around as well as along the length of the cylinder.

3. A dynamo-electric machine as claimed in claim 2 wherein the inner surface of each spacing member is formed with a curvature conforming to that of the outer surface of the cylinder.

4. A dynamo-electric machine as claimed in claim 1 wherein the stator comprises a core formed of sets of laminations with ring-like gaps between the sets, which gaps form said cooling ducts, the core being surrounded by a trunking arrangement for supplying fluid coolant to the bore of the stator through selected ones of the cooling ducts and for taking coolant from others of the cooling ducts.

5. A dynamo-electric machine as claimed in claim 1 wherein the cylinder defines part of an enclosure in which the rotor runs in a gaseous medium of low pressure.

6. A dynamo-electric machine as claimed in claim 1 wherein the cylinder defines part of an enclosure in which the rotor runs in a gaseous medium of low density.

References Cited
UNITED STATES PATENTS

| | | | |
|---|---|---|---|
| 2,663,808 | 12/1953 | Rosenberg et al. | 310—55 |
| 2,951,954 | 9/1960 | Willyoung | 310—61 |
| 3,340,412 | 9/1967 | Wiedemann | 310—54 |

FOREIGN PATENTS

| | | |
|---|---|---|
| 693,507 | 9/1964 | Canada. |
| 1,276,717 | 10/1961 | France. |

DONOVAN F. DUGGAN, Primary Examiner

U.S. Cl. X.R.
310—59, 86